(12) United States Patent
Dreymann et al.

(10) Patent No.: US 7,917,943 B1
(45) Date of Patent: *Mar. 29, 2011

(54) E-MAIL STAMPING WITH ACCREDITED ENTITY NAME

(75) Inventors: Daniel Dreymann, Palo Alto, CA (US); Gail Claspell, Mountain View, CA (US); Richard Gingras, Los Altos, CA (US); Justin Rietz, Cupertino, CA (US)

(73) Assignee: Goodmail Systems, Inc., Mountain View, CA (US)

( * ) Notice: Subject to any disclaimer, the term of this patent is extended or adjusted under 35 U.S.C. 154(b) by 801 days.

This patent is subject to a terminal disclaimer.

(21) Appl. No.: 11/566,013

(22) Filed: Dec. 1, 2006

(51) Int. Cl.
*G06F 15/16* (2006.01)

(52) U.S. Cl. .......................................... 726/4; 709/206
(58) Field of Classification Search ................ 713/170, 713/176, 16, 161, 172; 726/2, 4, 5; 709/206
See application file for complete search history.

(56) References Cited

U.S. PATENT DOCUMENTS

| | | | | |
|---|---|---|---|---|
| 5,771,289 | A * | 6/1998 | Kuzma | 713/153 |
| 6,640,301 | B1 * | 10/2003 | Ng | 713/156 |
| 7,421,474 | B2 * | 9/2008 | Motoyama et al. | 709/206 |
| 2002/0059454 | A1 | 5/2002 | Barrett et al. | |
| 2003/0200210 | A1 * | 10/2003 | Lin | 707/4 |
| 2004/0003255 | A1 * | 1/2004 | Apvrille et al. | 713/178 |
| 2004/0024823 | A1 * | 2/2004 | Del Monte | 709/206 |
| 2004/0093371 | A1 * | 5/2004 | Burrows et al. | 709/201 |
| 2004/0098609 | A1 * | 5/2004 | Bracewell et al. | 713/200 |
| 2004/0145773 | A1 * | 7/2004 | Oakeson et al. | 358/1.15 |
| 2004/0205135 | A1 * | 10/2004 | Hallam-Baker | 709/206 |
| 2004/0230652 | A1 * | 11/2004 | Estrada et al. | 709/204 |
| 2005/0188020 | A1 * | 8/2005 | Avritch et al. | 709/206 |
| 2005/0193075 | A1 * | 9/2005 | Haff et al. | 709/206 |
| 2005/0198170 | A1 * | 9/2005 | LeMay et al. | 709/206 |
| 2005/0198173 | A1 * | 9/2005 | Evans | 709/206 |
| 2005/0257261 | A1 * | 11/2005 | Shraim et al. | 726/22 |
| 2006/0075027 | A1 * | 4/2006 | Zager et al. | 709/206 |
| 2006/0101121 | A1 * | 5/2006 | Senechalle | 709/206 |
| 2006/0168019 | A1 * | 7/2006 | Levy | 709/206 |
| 2006/0200523 | A1 * | 9/2006 | Tokuda et al. | 709/206 |
| 2006/0277597 | A1 * | 12/2006 | Dreymann | 726/4 |
| 2007/0005702 | A1 * | 1/2007 | Tokuda et al. | 709/206 |
| 2007/0011253 | A1 * | 1/2007 | Taylor | 709/206 |
| 2007/0143407 | A1 * | 6/2007 | Avritch et al. | 709/206 |
| 2008/0059586 | A1 * | 3/2008 | Keohane et al. | 709/206 |
| 2008/0109448 | A1 * | 5/2008 | Aboel-Nil et al. | 707/10 |
| 2008/0244009 | A1 * | 10/2008 | Rand et al. | 709/206 |

* cited by examiner

*Primary Examiner* — Christopher A Revak
*Assistant Examiner* — Abdullah Almamun
(74) *Attorney, Agent, or Firm* — Fenwick & West LLP

(57) ABSTRACT

Effective aspects of stamping outbound e-mail are combined with a registration and entity identification system for e-mail senders. A mail sender participates by registering From: line and entity information with a trusted third-party repository known as a stamp authority. When the sender sends an e-mail message, the From: line is compared against the From: line information for the sender stored in the repository. If the result is a match, entity information is added and the e-mail is allowed to be sent. If there is not a match, then the e-mail is prevented from being stamped.

19 Claims, 3 Drawing Sheets

E-MAIL STAMPING WITH ACCREDITED ENTITY NAME

CROSS-REFERENCE TO RELATED APPLICATIONS

This application is related to U.S. patent application Ser. No. 11/421,748, filed on Jun. 1, 2006, which is incorporated by reference herein in its entirety.

BACKGROUND OF THE INVENTION

1. Field of the Invention

The present invention relates generally to e-mail security. In particular, the present invention is directed toward the registration and subsequent authentication of senders of e-mail.

2. Description of Background Art

The wide availability of domain name addresses for purchase has led to the nefarious practice of "phishing", in which a bad actor sends e-mails that appear to be from a reputable source and typically encourage the recipient to click on a link within the e-mail message and provide personal information to the sender. For example, the domain names "bank-of-america-online.com", "chasebank.cc", "my-citibank.us" are a sample of legitimate-sounding names that are currently available to the public for purchase.

Because the DNS records of a domain are under the control of the domain owner, messages sent from the domain will be marked as legitimate by conventional domain authentication schemes such as the Sender Policy Framework (SPF), the Sender ID Framework, DomainKeys, and Identified Internet Mail. That is, if a sender purchases the "bank-of-america-online.com" domain and sends an e-mail with a From header of "customerservice@bank-of-america-online.com", the message will be authenticated because it is indeed from who it claims to be from—the owner/operator of the bank-of-america-online.com domain.

Additionally, some e-mail programs (such as Microsoft's Hotmail, for example) display messages in an inbox using only the "display" string of an e-mail address, which is configurable by the sender. So, for example, an e-mail from phisher@bank-of-america-online.com could be configured by the sender to have a display name of "B of A Customer Service", in order to entice the recipient to open the message and follow links contained within.

Further, even if the source of an e-mail is known to be trustworthy, e-mail can suffer from a lack of consistent branding, which can be undesirable for both the sender and recipient alike. For example, consider a fictitious bank named "First Street Bank, Inc." If the bank's domain name is "fsbank.com", a branding opportunity is lost, since the domain name is not the same as the company name. In addition, display names may be non-standardized across different senders or different departments of the bank. For example, a user might receive e-mail from a sender at the bank with a display name of "Credit Card Offers", or e-mail from another sender at the bank with a display name of "First Street Bank Updates". Neither the display names nor the domain name clearly connote to the recipient that the e-mail is from "First Street Bank, Inc." One approach to resolving this difficulty includes using the header field "X-Organization," but this solution suffers from some of the same drawbacks, since it is neither standardized nor independently authoritative.

It would be of great assistance to e-mail recipients if a system and method existed for reliably accrediting and identifying senders of electronic mail messages.

SUMMARY OF THE INVENTION

The present invention combines the effective aspects of stamping outbound e-mail with a registration system for e-mail senders. A person or other entity (known henceforth as a mail sender, or simply a sender) participates by registering From: line information and a sender name with a trusted third-party repository known as a stamp authority. When the sender sends an e-mail message, the From: line is compared against the From: line information for the sender stored in the repository. If the result is a match, the e-mail is allowed to be sent, subject to any other restrictions imposed by the stamping process. If there is not a match, then the e-mail is prevented from being stamped. The sent e-mail includes a field containing the sender's name previously registered with the trusted third party.

DETAILED DESCRIPTION OF THE PREFERRED EMBODIMENTS

The use of stamps is a powerful, economically-driven solution to address the damage caused by spam and its negative after-effects such as false positives, spoofed messages and viruses. It shifts the burden of the high cost of fighting spam from the recipients to the senders of email. Stamping identifies and labels the "good" mail with stamps paid for by responsible high-volume senders who are subject to sender-level accreditation and made accountable for trusted email practices. Various stamping systems and methods are in conventional use, for example as described in U.S. Pat. No. 5,999,967 to Sundsted, which is incorporated by reference herein in its entirety.

The present invention makes use of stamping technology by making the availability of a stamp dependent on a match between the From: header in an outbound e-mail and a From: header previously registered with a stamp authority.

Figure 1:
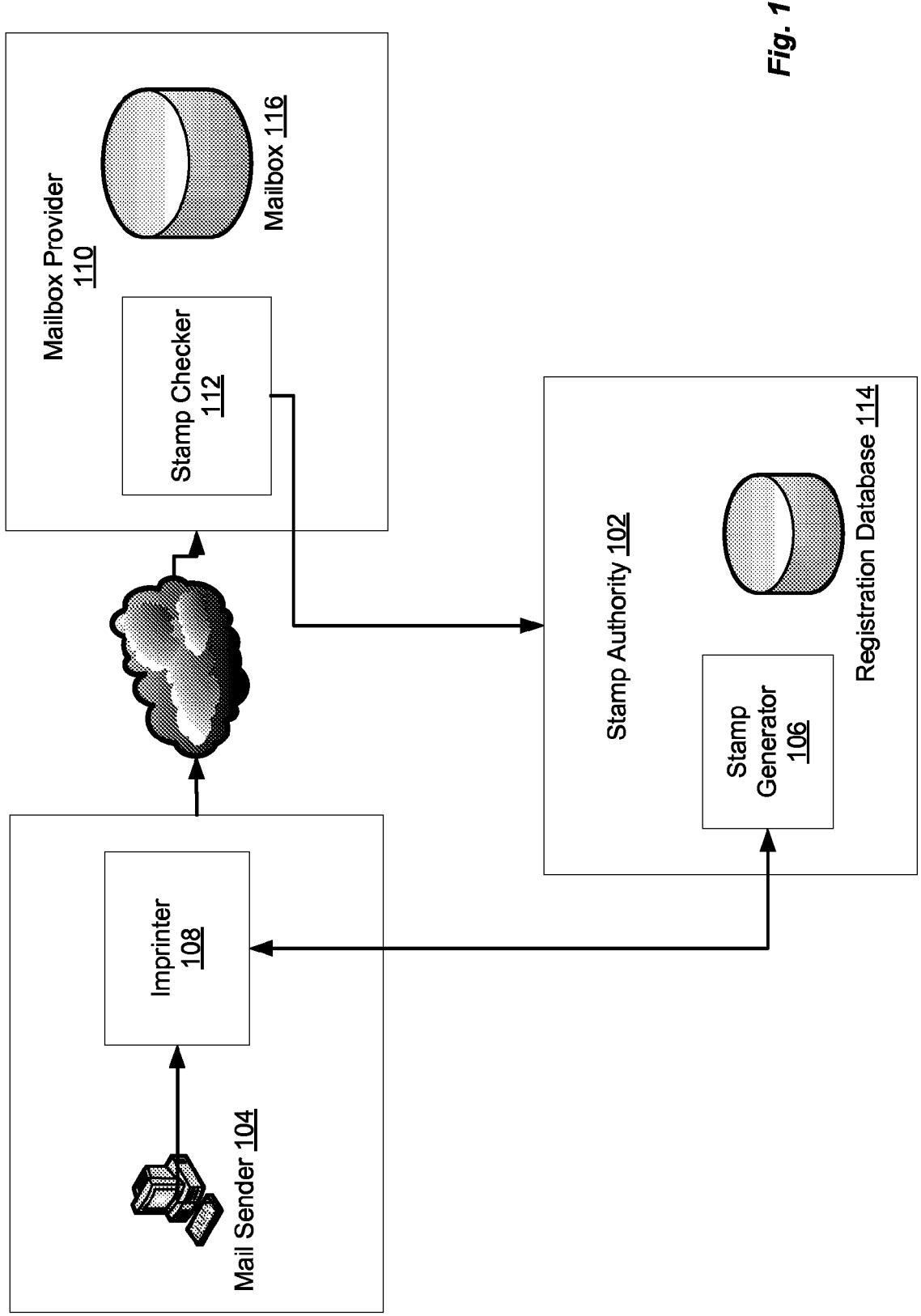
FIG. 1 is a block diagram of the overall architecture of an embodiment of the present invention.

FIG. 1 is a block diagram that illustrates the interaction of various components of an e-mail stamping system. FIG. 1 includes a stamp authority 102 having a registration database 114 and a stamp generator 106; a mail sender 104 having an imprinter 108; and a mailbox provider 110, having a stamp checker 112 and a mailbox 116.

Mail sender 104 sends e-mails to one or more recipients—typically to a large number of recipients, though for clarity of description we assume a single recipient in this instance without any loss of generality. When mail sender 104 sends an e-mail that he wishes to have stamped, the e-mail preferably is transmitted to imprinter 108, which creates appropriate stamp header fields as described below, calculates a hash of the message, and sends the hash to stamp generator 106 to be signed, have sender information inserted, and returned as a stamp. After receiving a stamp back from stamp generator 106, imprinter 108 then sends the e-mail to its intended recipient.

When stamp generator 106 receives the hash to be stamped from imprinter 108, it verifies that the mail sender 104 is authorized to use a stamp—for example, it verifies that the mail sender 104 is up to date on payments, has stamps in his account, has not violated any business rules that limit his ability to stamp e-mail, etc. Preferably imprinter 108 connects in real time to stamp authority 102 to have stamp generator 106 perform the verification; alternatively, outgoing e-mails can be queued and the verification process can take place during a batch update when connection to stamp authority 102 is available.

In addition to verifying that the mail sender 104 is authorized to use a stamp, stamp generator 106 also determines whether the From: header information included in the message matches the header information stored in registration database 114, as described further below. Stamp generator 106 then adds to the message the entity name associated with the sender and stored in registration database 114.

Once stamp generator 106 adds the entity name and determines that mail sender 104 is authorized to use a stamp and that the From: header information in the messages is legitimate, it generates a stamp and provides the stamp to imprinter 108 to allow the e-mail to be sent.

The e-mail then travels in a conventional method to a mailbox provider 110. Upon arrival, stamp checker 112 examines the stamp to determine whether the stamp is valid as described further below. If the stamp is valid, then the e-mail is delivered to the mailbox 116 of the addressed recipient, subject to any additional rules imposed by the mailbox provider or the recipient herself. If the stamp is not valid, this indicates that there might have been external tampering, or a transmission or other error, and the e-mail is rejected.

Stamp authority 102 is an agent that oversees the stamping process by issuing stamps to mail senders and enforcing business rules related to the sending of e-mail by the mail senders. In addition, a mail sender 104 registers complete From: line and entity name information with stamp authority 102, and the information is then maintained in a registration database 114 for subsequent verification and insertion when mail sender 104 attempts to obtain a stamp for an e-mail message.

Figure 2:
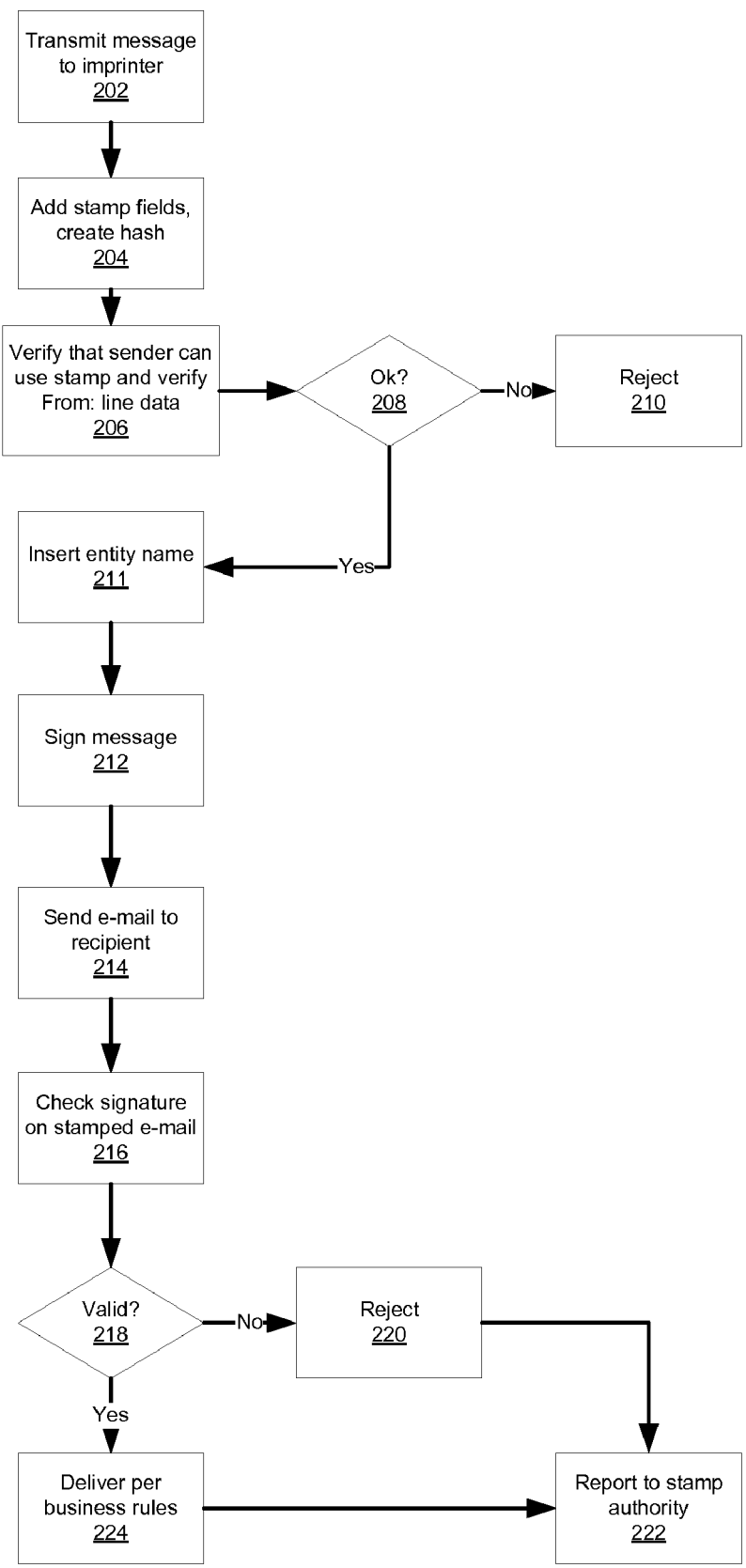
FIG. 2 is a flowchart illustrating a method of stamping e-mail messages with From: header authentication in accordance with an embodiment of the present invention.

FIG. 2 illustrates a method of e-mail stamping with From: header validation and entity name accreditation in accordance with an embodiment of the present invention.

Mail sender 104 initially sends 202 a message to be stamped to imprinter 108. In a preferred embodiment, a stamp is unique for each message, and is a cryptographic object contained within the header of the e-mail message. The stamp includes a variety of header fields, for example:
X-StampAuthority-Rcpto: joe@example.com
X-StampAuthority-Reply-To: mary@example.com
X-StampAuthority-Sender: amy@example.com
X-StampAuthority: 1; i="12345";
s="0000001C0000001C0001000141D32376000000001000-0001300000002";
e="20040612T123256"; d="20040608T082310"; o="342AC5"; t="2";
h="4Io7sVcs55HmRWhSE3QucCKHc1U=";
f="Qm1nIFRydWNrcyBvZmZlcnNAYmlndHJ1Y2tlmNvbQ==";
b="6MdkylkSixEEfv7oh38fO6O2uic=";
X-StampAuthority-Entity: First Street Bank, Inc.
X-StampAuthority-Sig:
MfowCwYJKoZIhvcNAQEBAOsAMEgCQQDNZ+
V7wcxLqyAQRiHtMySKtD5UfT/rdFzaGehCmp8QECD
KhPKqRC2EMbvBXZVdNIo500yrPayUKBYxfjMcxc5
AgMBAAE=

The particular header fields chosen to implement the present invention may be determined according to the needs of the implementer. In a preferred embodiment, one header field includes a parameter containing a base64-encoded normalized From: header value.

To normalize, in one embodiment the following rules are observed: the comment part must have any surrounding full quotation marks and surrounding parentheses removed. All whitespace characters must be preserved. The address part must not include a comma, more than one @ character, or a colon. The address part must have any surrounding angle braces preserved. If the address part lacks surrounding angle braces, surrounding angle braces must be added. In the "f" parameter, the comment part precedes the address part and is separated from the address part by exactly one space character. The result is base64 encoded for transport.

Imprinter 108 also adds a header transit hash to the message, represented by the "h=" string in the example shown above, and a body transit hash, represented by the "b=" string in the example shown above. In a preferred embodiment, the "h" parameter contains the base64 encoded SHA1 hash of data specific to the email message stamped. The inclusion of the hash in the stamp binds the stamp to the message headers, and it protects message headers during transit by allowing filters to detect if message headers have been modified. The "b" parameter contains the base64 encoded SHA1 hash of data specific to the email message stamped. The inclusion of the hash in the stamp binds the stamp to the message body, and it protects the message body during transit by allowing filters to detect if the message has been modified.

Once the stamp fields and hash are created 204, imprinter 108 forwards the hash to stamp generator 106, which verifies 206 that the sender is authorized to issue a stamp. A mail sender 104 may be ineligible to issue a stamp if, for example, the sender has used up all of the stamps purchased from stamp authority 102.

Stamp generator 106 verifies From: header information against the From: header registered in registration database 114. Preferably, if 208 there is not a match between what is registered and what is in the e-mail header, stamp generator 106 will reject 210 the message. If there is a match and the mail sender 104 is otherwise allowed to send a stamped message, stamp generator 106 inserts 211 the registered entity name stored in database 114 and associated with the sender. Stamp generator 106 then adds 212 its signature to the header and returns the message to imprinter 108, which then sends 214 the message to the message's specified recipient.

In one embodiment, stamp generator 106 has a private/public key pair generated in a conventional manner. Stamp generator 106 uses the parameters such as those listed below and its private key to create a transit signature using a cryptographic algorithm, for example RSASSA-PKCS1-V1_5. The parameters used by the stamp generator 106 to create the stamp in one embodiment are: a version number of the stamping protocol; a unique ID for that stamp; an indication of a stamp type (adult, commercial, etc.); a hash of the message created from the message and the stamp fields (obtained from imprinter 108 as described above); Sender: and From: information (obtained from the message envelope by imprinter 108); and RCPT TO: information (obtained from the message envelope by imprinter 108). Other parameters could also be used as deemed appropriate by an implementer of such a system.

The creation of the transit signature in a preferred embodiment first involves the creation of a hash of all of the fields being signed (which includes all stamp fields and the message hash), and then the signing algorithm is implied. Thus, there are essentially two hash operations being performed; the first operation is of the entire message and the stamp fields, which yields a value that is then inserted as one of the fields in the stamp. This field, along with all other stamp authority 102 fields, is then hashed in a second hash operation, the value of which is then signed using cryptography. In this way, these stamp authority 102 fields can be validated without the entire message being present. In a preferred embodiment, the above parameters including the transit signature, combined with the certificate, create a fully-formed stamp.

When the e-mail is received by mailbox provider 110, stamp checker 112 checks 216 the signature on the stamped e-mail to determine whether it is valid.

In one embodiment, the certificate is verified by stamp checker 112 as follows. Stamp checker 112 uses the stamp authority's public key previously obtained. Next, stamp checker 112 determines a hash of the fields in the certificate. Stamp checker 112 then takes the hash, the stamp authority public key, and the certificate signature and performs a signature verification operation to check whether the signature of the certificate (and hence the certificate) is valid.

If 218 the certificate is not valid, stamp checker 112 either rejects 220 the message outright, or delivers it to the mailbox 116 of the specified recipient, but preferably with an indication that it does not have an accompanying valid certificate. For example, as described below with respect to FIG. 3, messages without valid certificates are displayed in one embodiment without a certification icon in order to distinguish them from certified messages. Alternatively, if the message is rejected, additional steps can be taken, for example the sender of the message could be notified that a message was received claiming to be from the sender 104 but was not successfully validated. Preferably, a report is also made 222 to the stamp authority 102.

If 218 the certificate is valid, then the e-mail is delivered 224 by mailbox provider 110 to the mailbox 116 of the specified recipient, subject to any other delivery rules that the mailbox provider or owner may have set up for mail handling. When displayed to the recipient, the e-mail includes the entity name associated with the sender. Accordingly, the recipient can know with certainty the identity of the entity sending the e-mail message. Preferably, a report is then made 222 to the stamp authority 102, so that the stamp can be cancelled and not reused.

Figure 3:
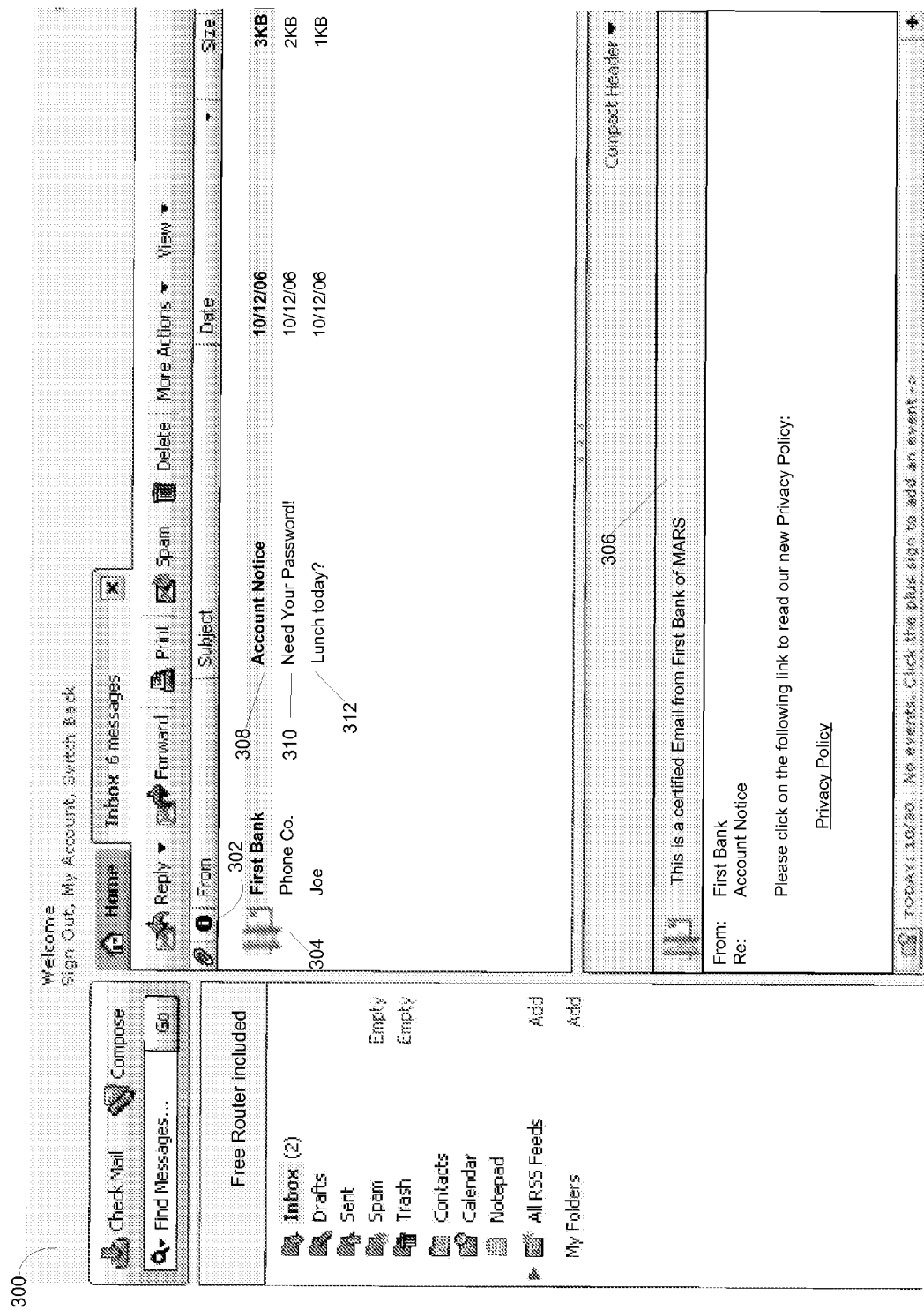
FIG. 3 is an illustration of a user interface displaying an accredited entity name in accordance with an embodiment of the present invention.

FIG. 3 illustrates an example user interface (UI) 300 that displays an entity name in accordance with an embodiment of the present invention. The illustrated user interface in the example of FIG. 3 is that of a mail client. The UI 300 displays incoming messages and includes for each listed message an information column 302. In the illustrated case, three messages are in the user's inbox—a first 308, from "First Bank"; a second 310, from "Phone Co."; and a third 312, from "Joe". The first message 308 includes an icon 304 that represents an e-mail message from a certified entity. When a user views a message from a certified entity, a display 306 is provided including the true registered name of the sender—in the illustrated case, "First Bank of MARS". In contrast, messages two 310 and three 312 are not from certified entities, or were delivered with invalid certificates, and thus no icon appears in the information column 302 next to their messages. As will be appreciated by those of skill in the art, UI 300 is but one of many possible ways to display to a user whether a message is from a certified entity as well as the identity of the certified entity.

In an alternative embodiment of the invention, rather than using the From: line and the entity name as described above, a mail sender 104 instead obtains from stamp authority 102 a signed certificate, issued by the stamp authority 102, certifying that the sender 104 is accredited, i.e. that the sender is legitimate, and associated with the specified entity name. The mail sender 104 then attaches the certificate to an e-mail message, for example using Domain Keys Identified Mail (DKIM); by embedding the certificate; or using other methods of domain authentication known in the art. When mailbox provider 110 receives the e-mail message, it extracts the entity name from the certificate (if the certificate contains the entity name), or alternatively compares the embedded certificate against the From: header and entity name in the message. If there is a match, then the message is delivered to the mailbox 116 of the addressee. If not, the message is displayed without a certification icon 304, or is rejected.

In another alternative embodiment, mail sender 104 registers its From: address and entity name with stamp authority 102. Regardless of whether mail sender 104 indicates to mailbox provider 110 that it should query the stamp authority's registration database 114 of registered mail senders, mailbox provider 110 makes such a query, and determines whether the From: header and entity name in the received message matches a From: header and entity name registered with stamp authority 102 as being associated with that mail sender 104. If so, the message is delivered to the address's mailbox 116. If not, the message is displayed without a certification icon 304, or is rejected.

Alternatively, even if mail sender 104 does not register its From: address and entity name with stamp authority 102, stamp authority 102 may keep its own list, compiled based on third-party data or its own research, of domain names and valid From: headers and entity names associated with those domain names. When mailbox provider 110 queries the stamp authority 102, stamp authority 102 determines whether the domain name of the mail sender 104 matches a known From: address and entity name associated with the domain name. If so, the message is delivered to the address's mailbox 116. If not, the message is displayed without a certification icon 304, or is rejected.

In an additional embodiment, entity name registration and insertion is carried out without the additional step of From: header validation. Thus, regardless of what a sender provides as the From: address, the entity name will still reflect the name registered with stamp authority 102.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the stamp generator 106 and so forth may be provided in many or one module.

Some portions of the above description present the feature of the present invention in terms of algorithms and symbolic representations of operations on information. These algorithmic descriptions and representations are the means used by those skilled in the art of e-mail security to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method for validating a sender of an e-mail message, the method comprising:
   receiving an e-mail from the sender, the e-mail including a header, the header having a first field, the contents of the first field indicating the sender's identity;
   determining, by an authority, that the sender is authorized to use the identity indicated by the contents of the first field;
   inserting, by the authority, a second field in the header, the contents of the second field indicating that the sender is authorized to use the identity indicated by the contents of the first field;
   determining an entity name associated with the sender;
   inserting, by the authority, a third field in the header, the contents of the third field indicating the entity name associated with the sender; and
   inserting a token in the header, the token including a digital signature associated with the authority.

2. The method of claim 1, further comprising:
   returning the e-mail to the sender.

3. The method of claim 1, further comprising:
   sending the e-mail to a recipient indicated in the header.

4. The method of claim 1 wherein the contents of the second field are cryptographically encoded.

5. The method of claim 1 wherein the first field is a "From:" field.

6. The method of claim 5 wherein the contents of the field include an e-mail address.

7. The method of claim 5 wherein the contents of the field include a display name.

8. A computer-implemented method for validating a sender of an e-mail message, the method comprising:
   registering identification information about an e-mail sender with an authority;
   registering entity information about the e-mail sender with the authority;
   sending a header associated with an e-mail message from the e-mail sender to the authority, the header including origination information, the origination information indicating that the associated e-mail message is from the e-mail sender;
   receiving from the authority a modified header, the modified header associated with the e-mail message and additionally including a field indicating the registered entity information for the sender and a token indicating that the origination information is accurate; and
   sending the e-mail message and the associated modified header to a recipient.

9. The method of claim 8 wherein the registered identification information about the e-mail sender includes an e-mail address associated with the sender.

10. The method of claim 9 wherein the e-mail address includes a domain name and the entity information includes an entity name differing from the domain name.

11. The method of claim 8 wherein the identification information about the e-mail sender includes a display name associated with the sender.

12. The method of claim 8 wherein the origination information includes a From: address field.

13. The method of claim 12 wherein the From: address field includes an e-mail address.

14. The method of claim 12 wherein the From: address field includes a display name.

15. A computer program product for validating a sender of an e-mail message, the computer program product stored on a computer-readable non-transitory medium and including instructions configured to cause a processor to carry out the steps of:

registering identification information about an e-mail sender with an authority;

registering entity information about the e-mail sender with the authority;

sending a header associated with an e-mail message from the e-mail sender to the authority, the header including origination information, the origination information indicating that the associated e-mail message is from the e-mail sender;

receiving from the authority a modified header, the modified header associated with the e-mail message and additionally including a field indicating the registered entity information for the sender and a token indicating that the origination information is accurate; and sending the e-mail message and the associated modified header to a recipient.

16. A system for validating a sender of an e-mail message, comprising:

a stamp authority, including:

a registration database for storing identification information and entity name information for an e-mail sender;

a stamp generator for receiving from the e-mail sender a header associated with an e-mail message, the header including origination information, the origination information indicating that the associated the e-mail message is from the e-mail sender; and wherein the stamp generator is further adapted to determine that the identification information about the e-mail sender stored in the registration database matches the origination information in the header, and to create a modified header, the modified header associated with the e-mail message and additionally including the entity name information for the sender and a token indicating that the origination information is accurate.

17. The system of claim 16 wherein the stamp generator is further adapted to return the modified header to the e-mail sender.

18. The system of claim 16 wherein the identification information about the e-mail sender stored in the registration database includes an e-mail address.

19. The system of claim 16 wherein the identification information about the e-mail sender stored in the registration database includes a display name.

* * * * *